(12) United States Patent
Devie et al.

(10) Patent No.: US 6,909,498 B2
(45) Date of Patent: Jun. 21, 2005

(54) METHOD AND APPARATUS FOR MEASURING THE GEOMETRICAL STRUCTURE OF AN OPTICAL COMPONENT IN TRANSMISSION

(75) Inventors: Pierre Devie, Chevily Larue (FR); Francis Bell, Rueil-Malmaison (FR); Gilles Le Saux, Paris (FR)

(73) Assignee: Essilor International (FR)

( * ) Notice: Subject to any disclaimer, the term of this patent is extended or adjusted under 35 U.S.C. 154(b) by 123 days.

(21) Appl. No.: 10/110,152
(22) PCT Filed: Aug. 17, 2001
(86) PCT No.: PCT/FR01/02626
§ 371 (c)(1), (2), (4) Date: Oct. 28, 2002
(87) PCT Pub. No.: WO02/16902
PCT Pub. Date: Feb. 28, 2002

(65) Prior Publication Data
US 2003/0112426 A1 Jun. 19, 2003

(30) Foreign Application Priority Data
Aug. 22, 2000 (FR) .......................................... 00 10794

(51) Int. Cl.$^7$ ................................................ G01B 9/00
(52) U.S. Cl. .................................... 356/124; 250/201.9
(58) Field of Search ................................ 356/124, 515; 376/121; 250/201.9

(56) References Cited

U.S. PATENT DOCUMENTS

| 5,581,347 A | * 12/1996 | Le Saux et al. ............ 356/124 |
| 5,825,476 A | * 10/1998 | Abitol et al. ................ 356/124 |
| 6,043,885 A | * 3/2000 | Mazuet et al. ............... 356/124 |
| 6,072,570 A | * 6/2000 | Chipman et al. ............ 356/124 |
| 6,577,400 B1 | * 6/2003 | Klaver ........................ 356/515 |
| 6,750,958 B1 | * 6/2004 | Fantone et al. ............. 356/124 |

FOREIGN PATENT DOCUMENTS

| JP | 01257229 A1 | 10/1989 |
| WO | 99/64817 | 12/1999 |

* cited by examiner

*Primary Examiner*—Zandra Smith
*Assistant Examiner*—Kara Geisel
(74) *Attorney, Agent, or Firm*—Fish & Richardson P.C.

(57) ABSTRACT

A method for measuring the geometrical structure of an optical component (2) in transmission, comprises illuminating the optical component by means of a first incident beam (8, 10), the wavefront of which is known. After the first beam is transmitted by the optical component, its wavefront is measured by deflectometry (16, 18). The optical component is then illuminated by a second incident beam (12, 14), the wavefront of which is known. After the second beam is transmitted by the optical component, its wavefront is measured by deflectometry (16, 18). The geometrical structure of the optical component is then calculated from the measured wavefronts.

Measuring light transmitted in two distinct optical configurations allows a calculation by optimizing the two surfaces of the component, without prior knowledge of one of the surfaces. The first and second beams may be different and may illuminate the same surface of the component; thus it is possible to use identical beams and to illuminate each surface of the component in succession.

28 Claims, 19 Drawing Sheets

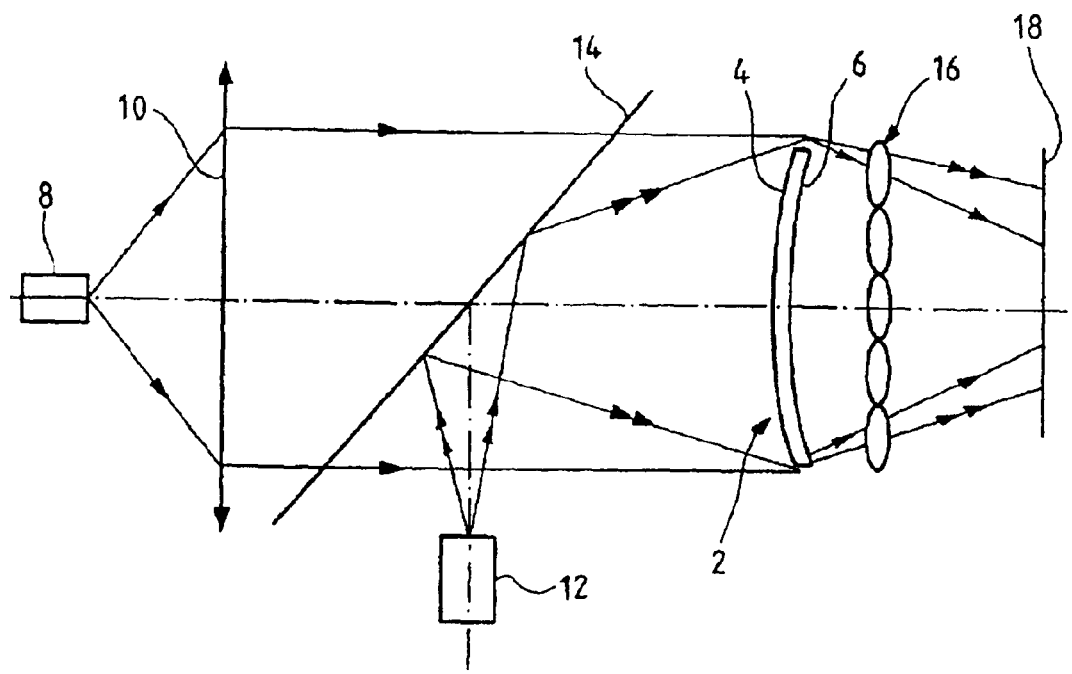
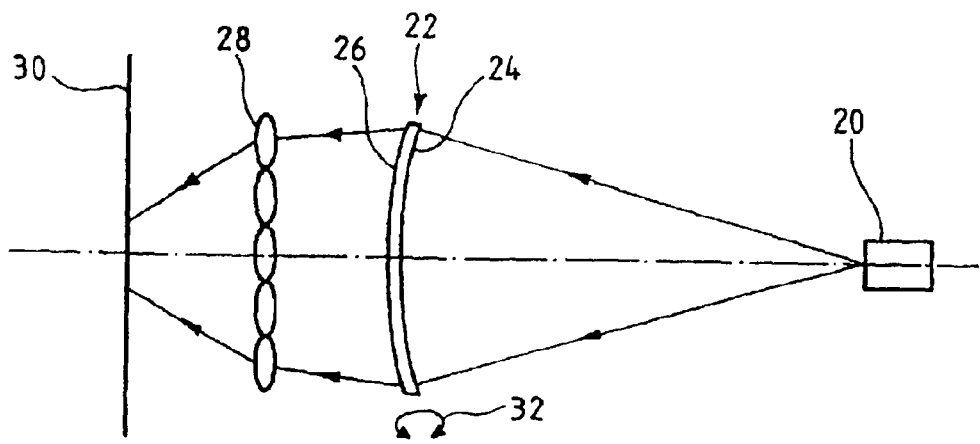

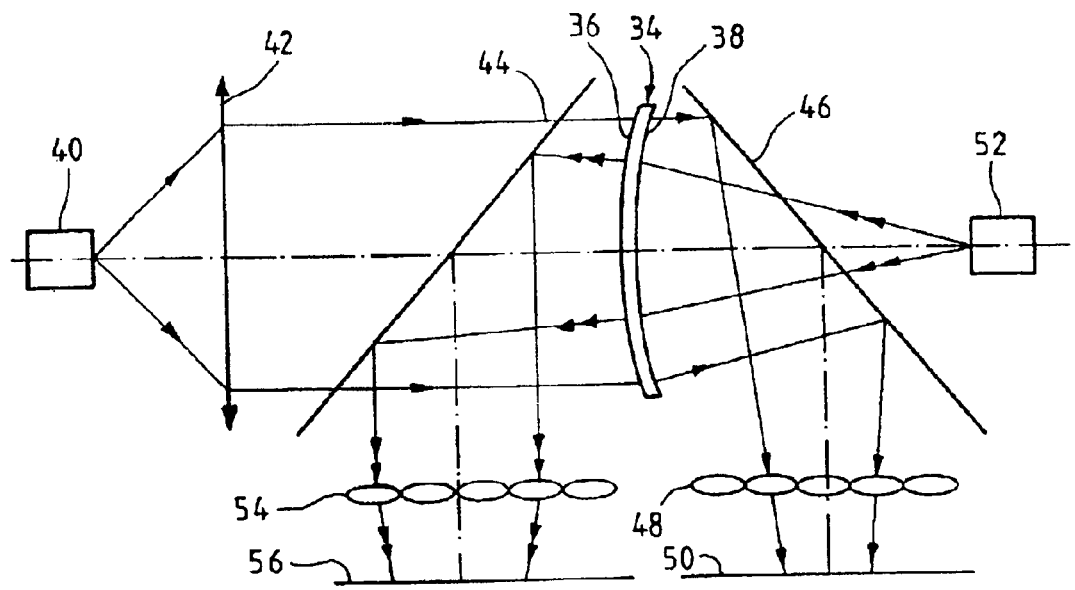
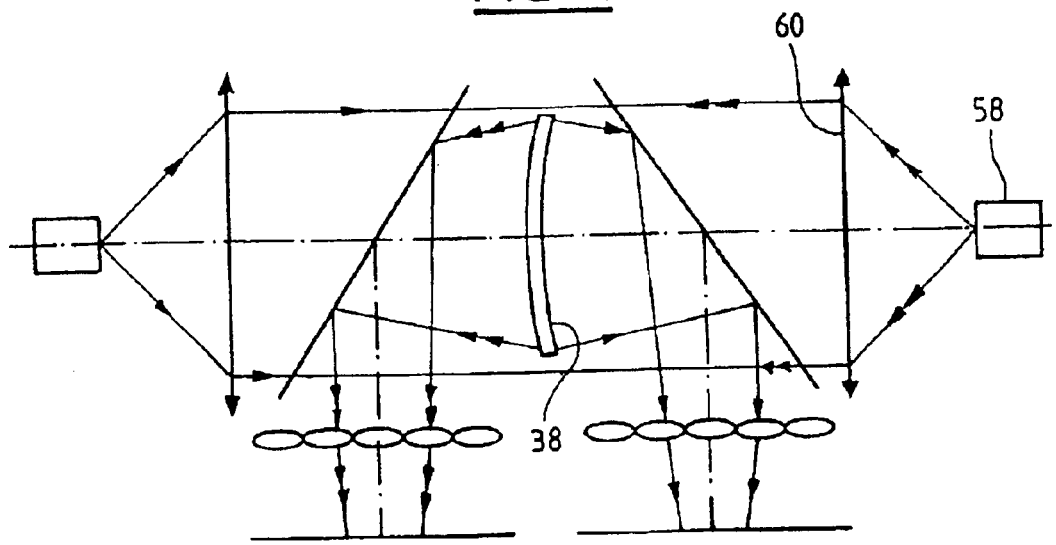

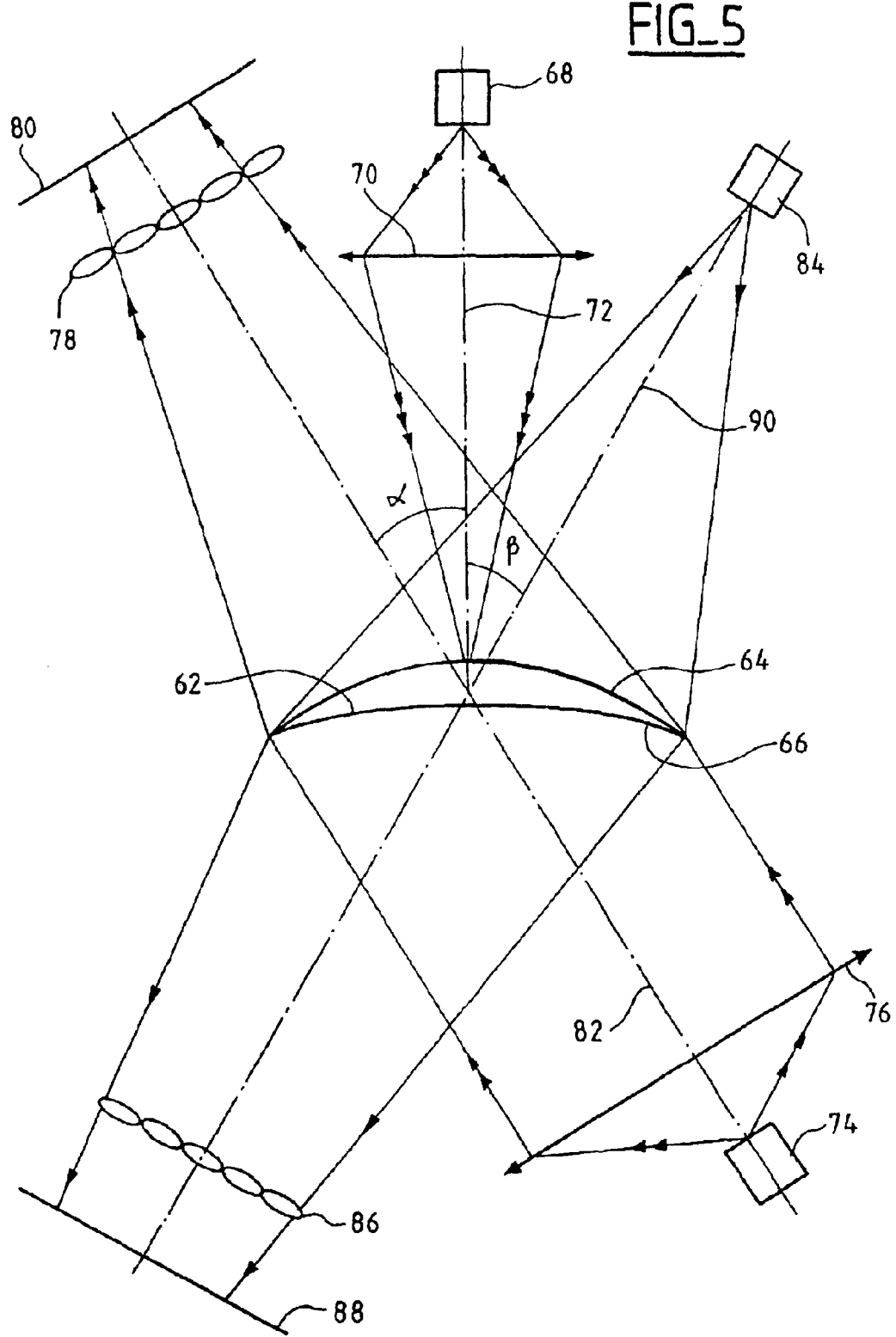
FIG_5

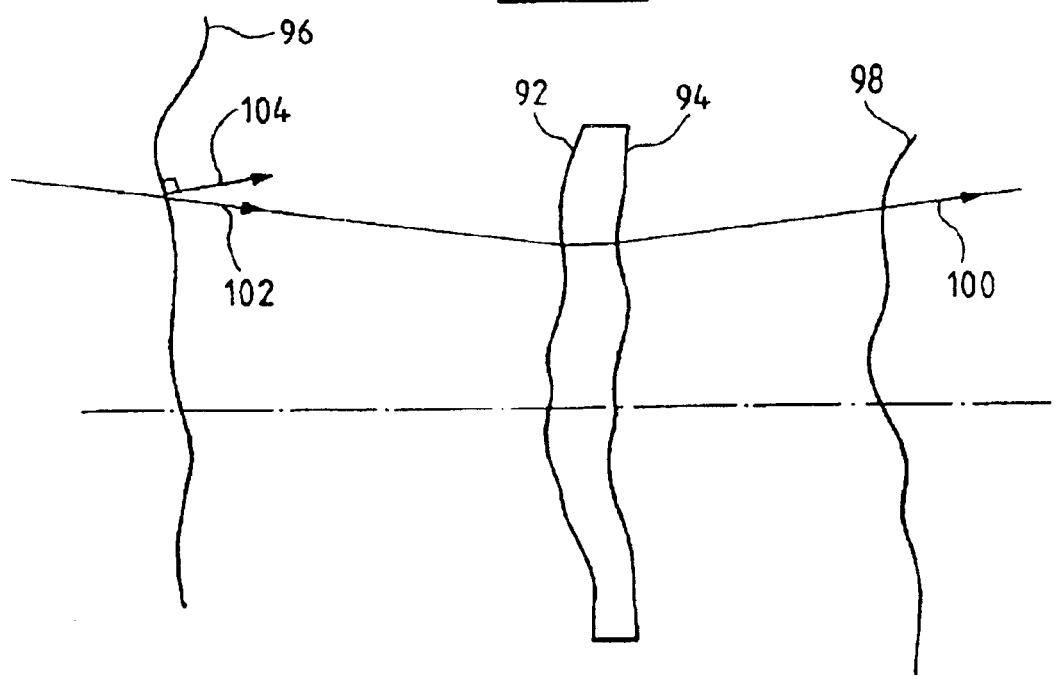
FIG_6
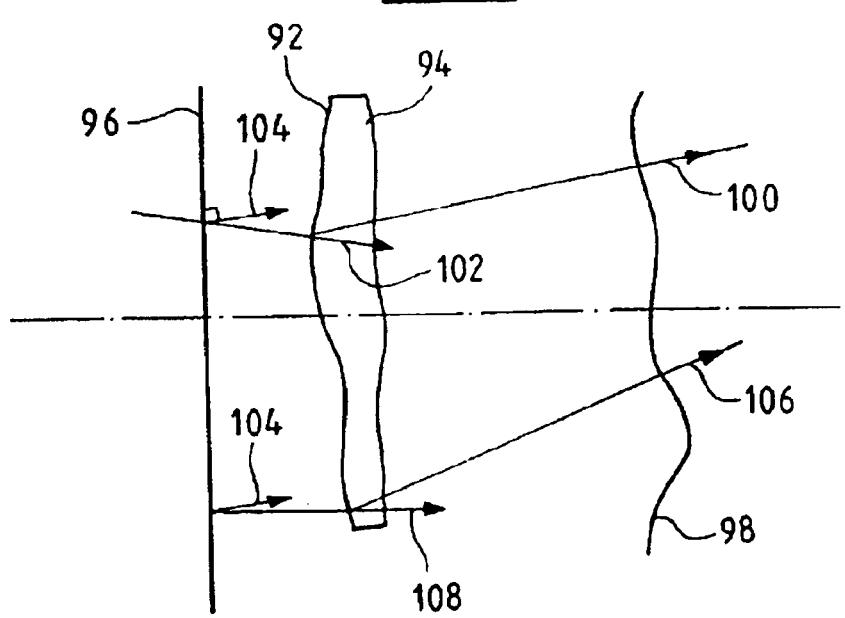
FIG_7

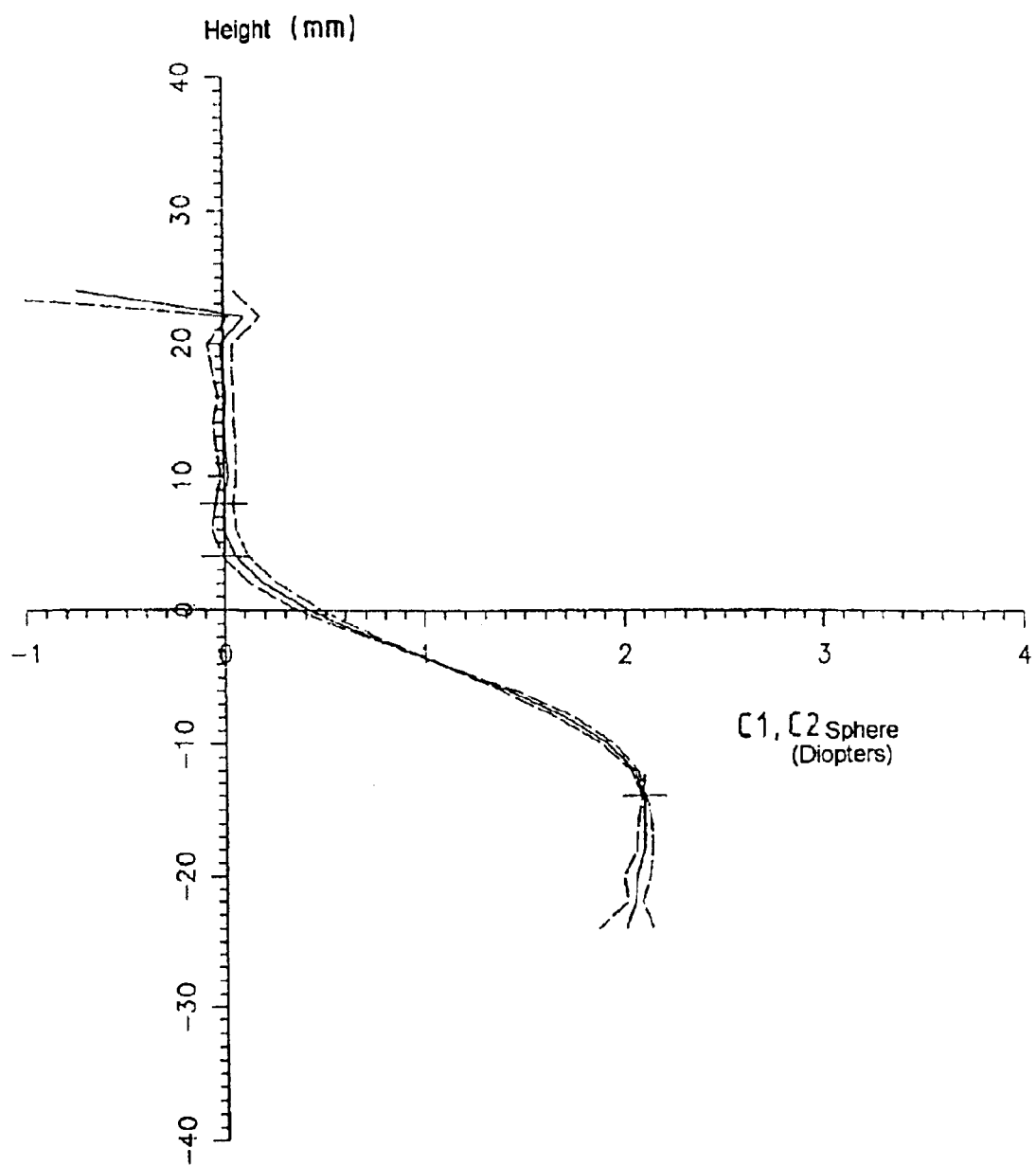
FIG_8

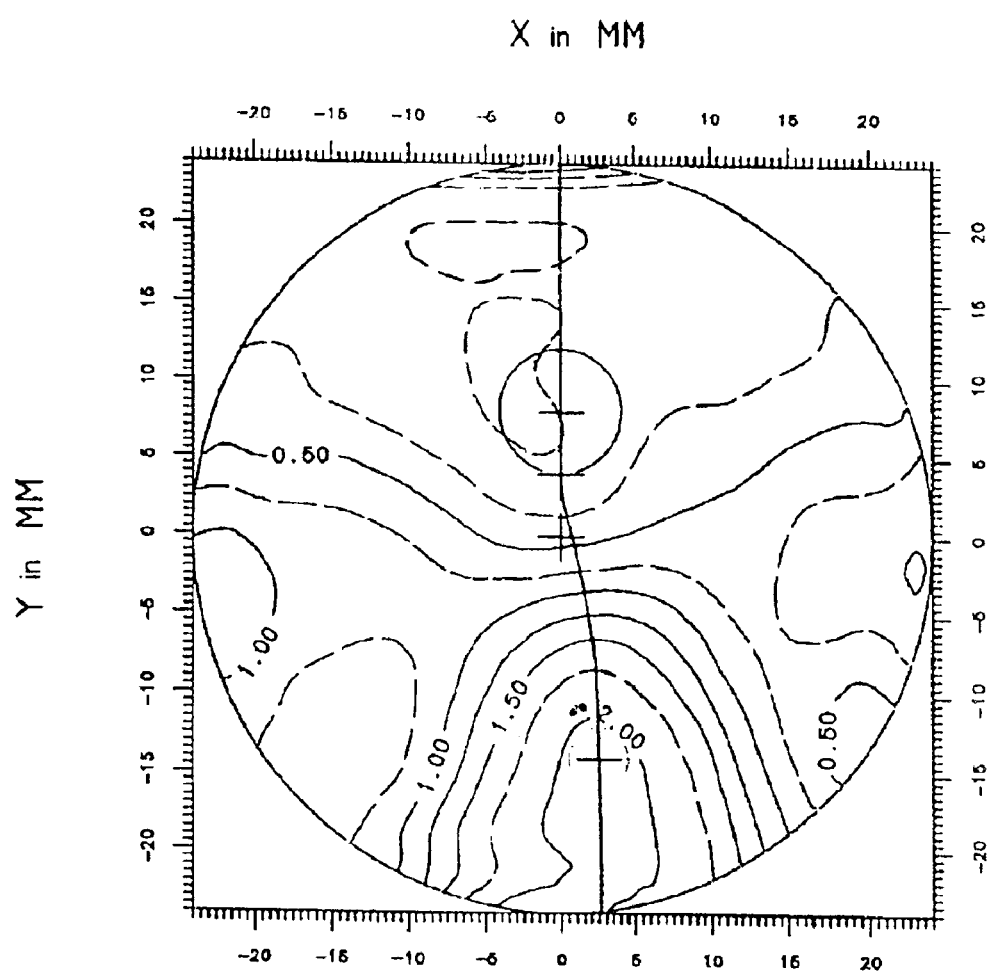

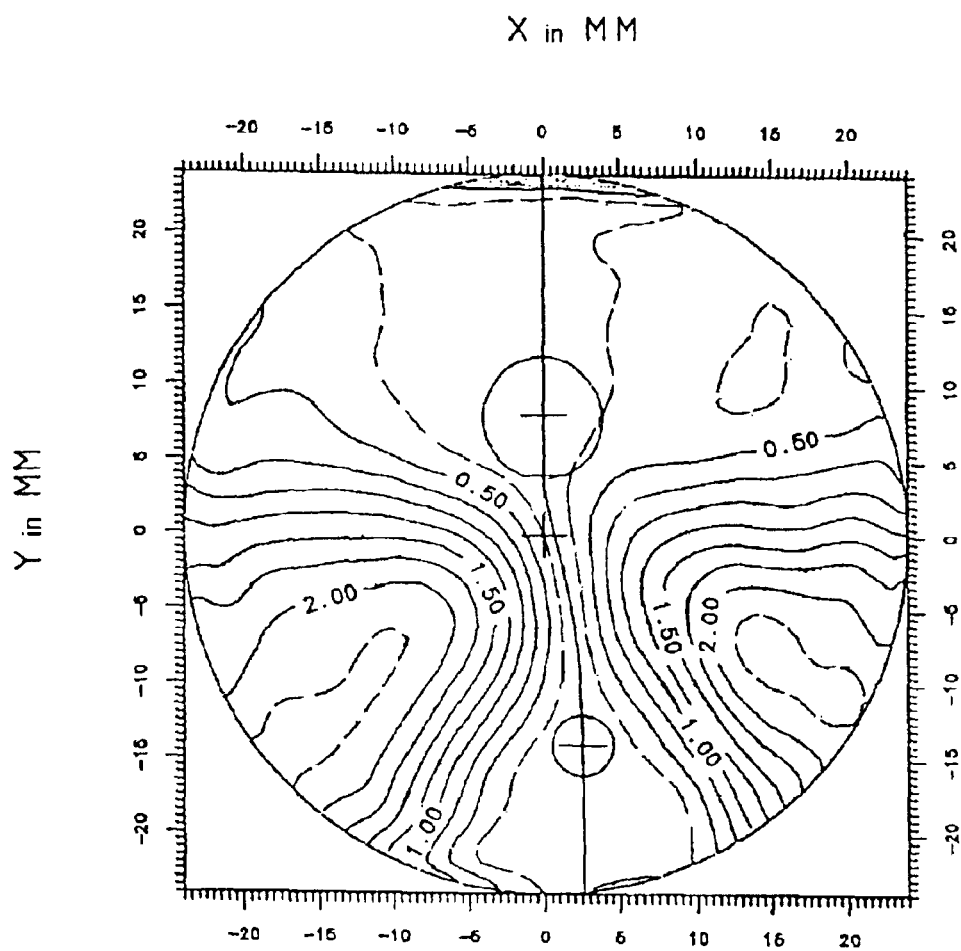

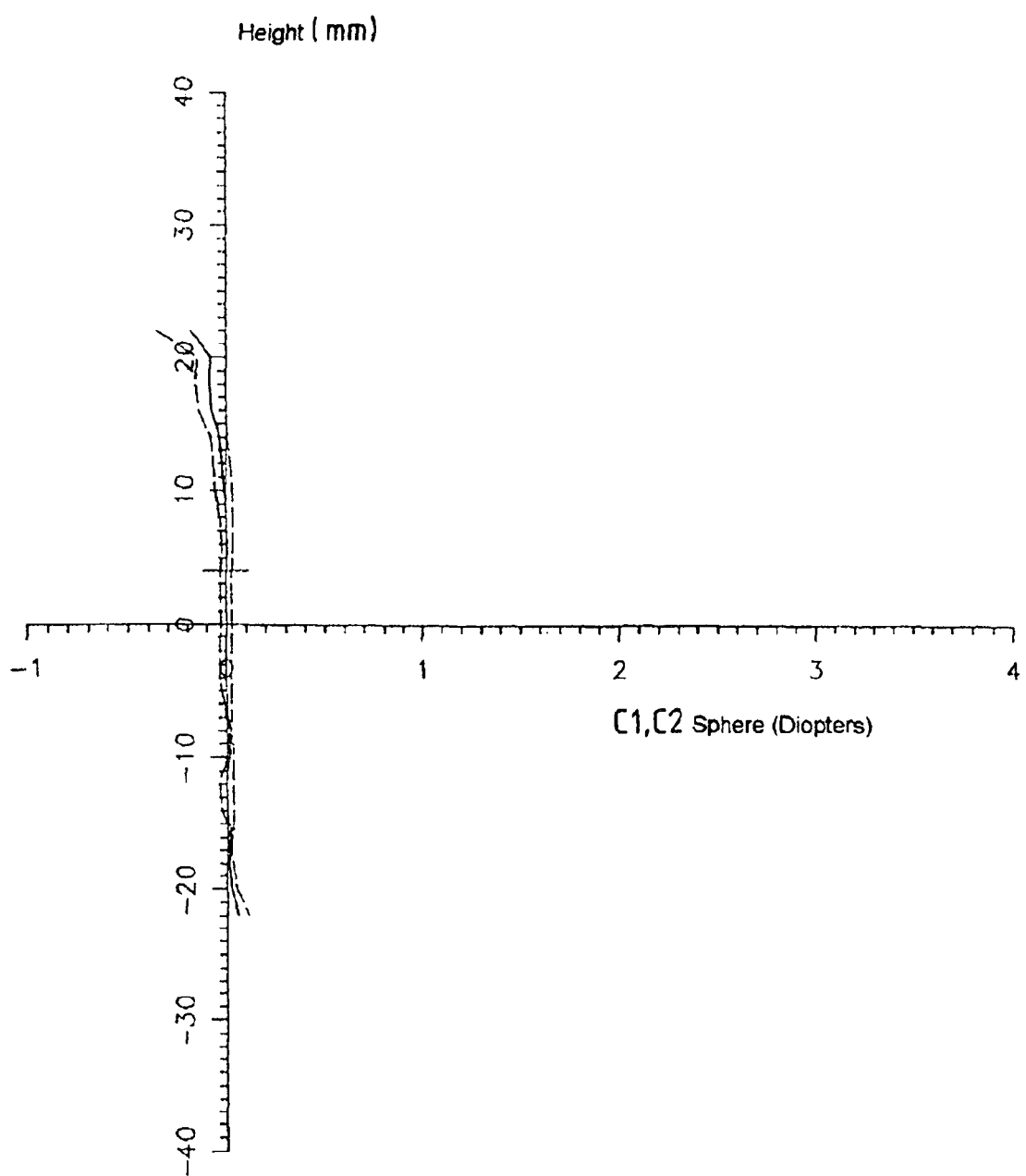
FIG_11

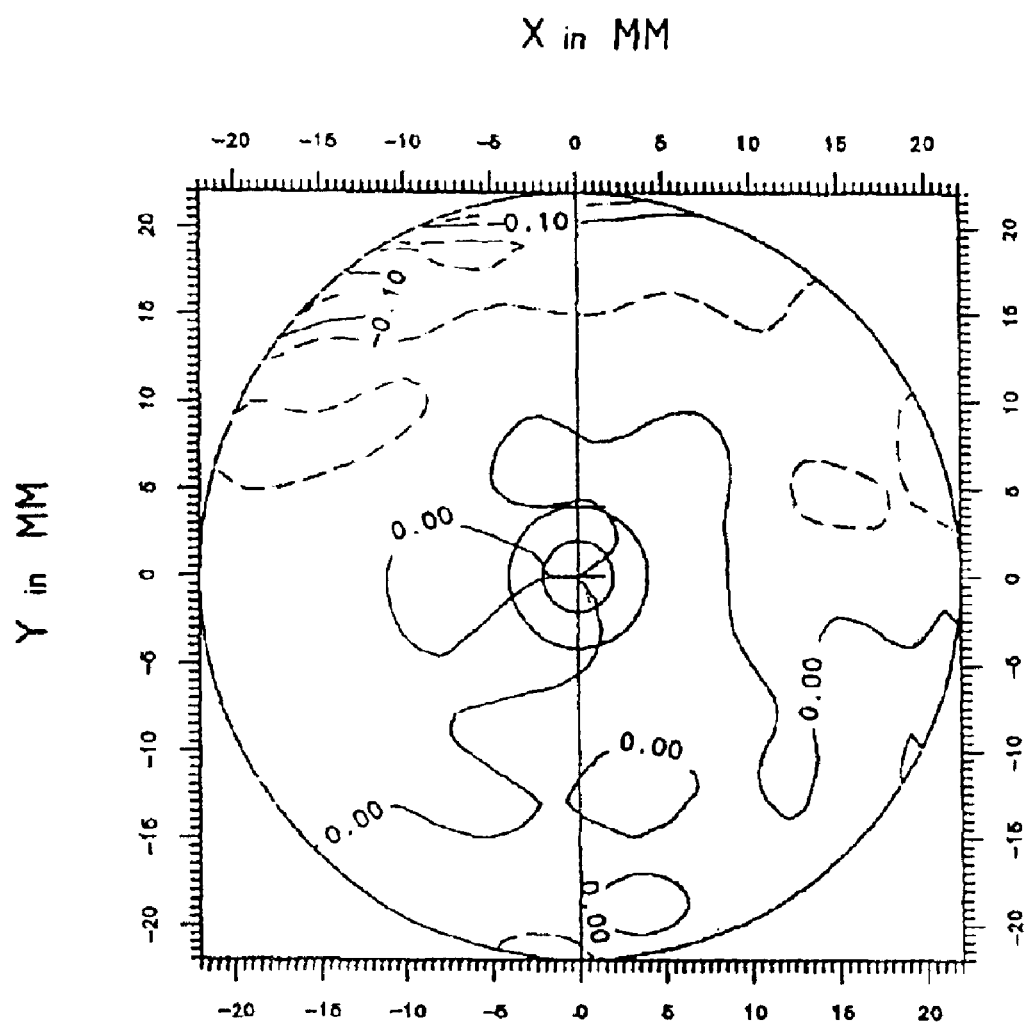

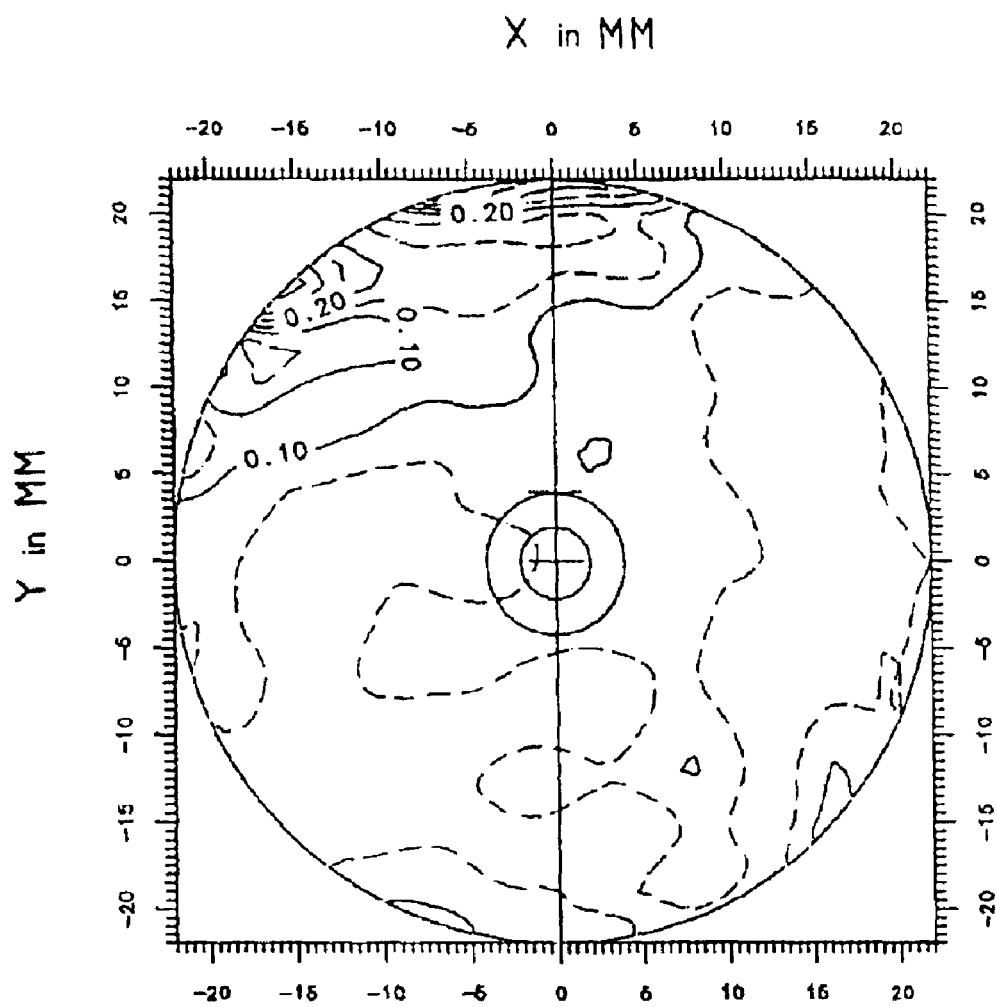
FIG_13

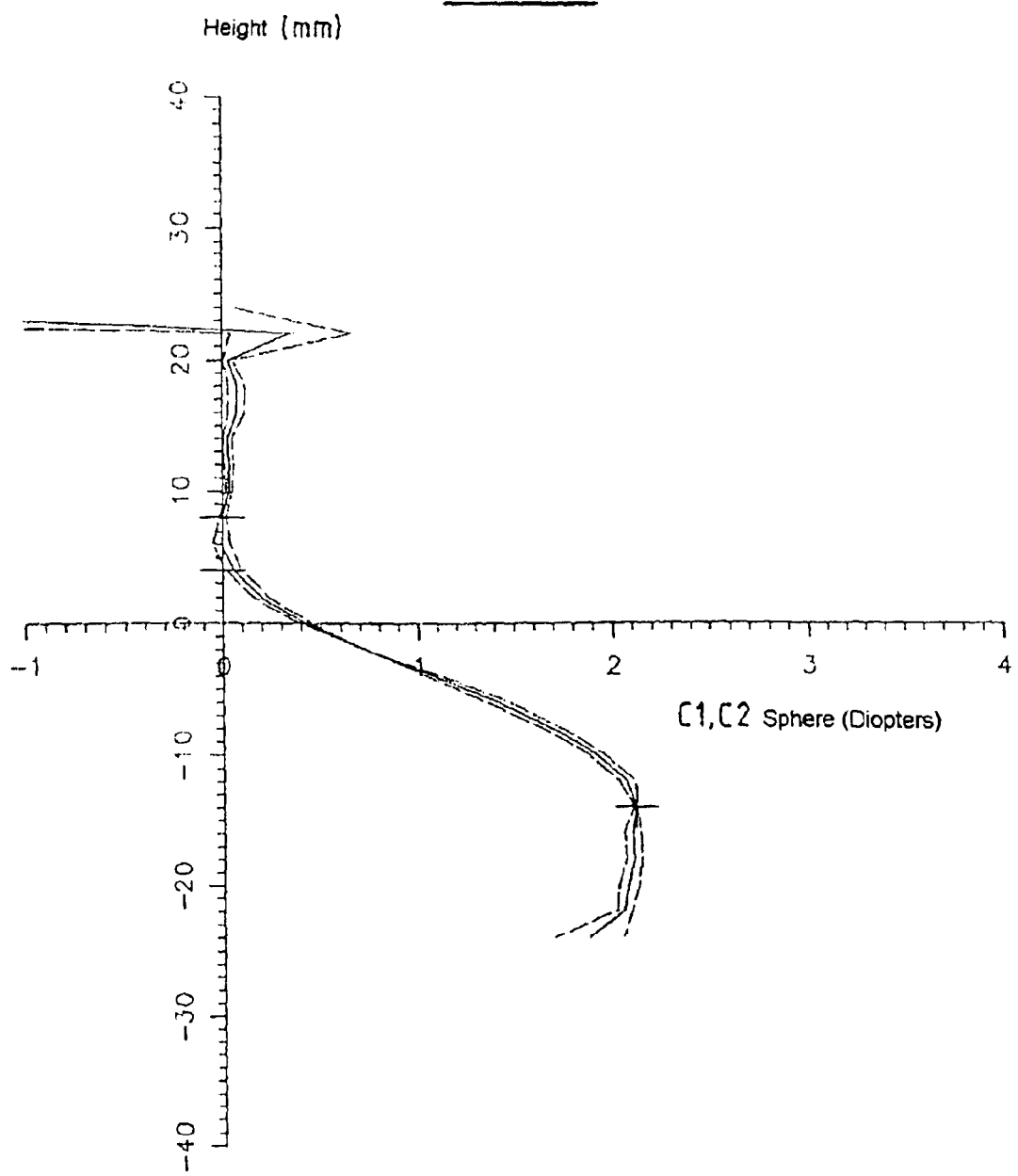
FIG_14

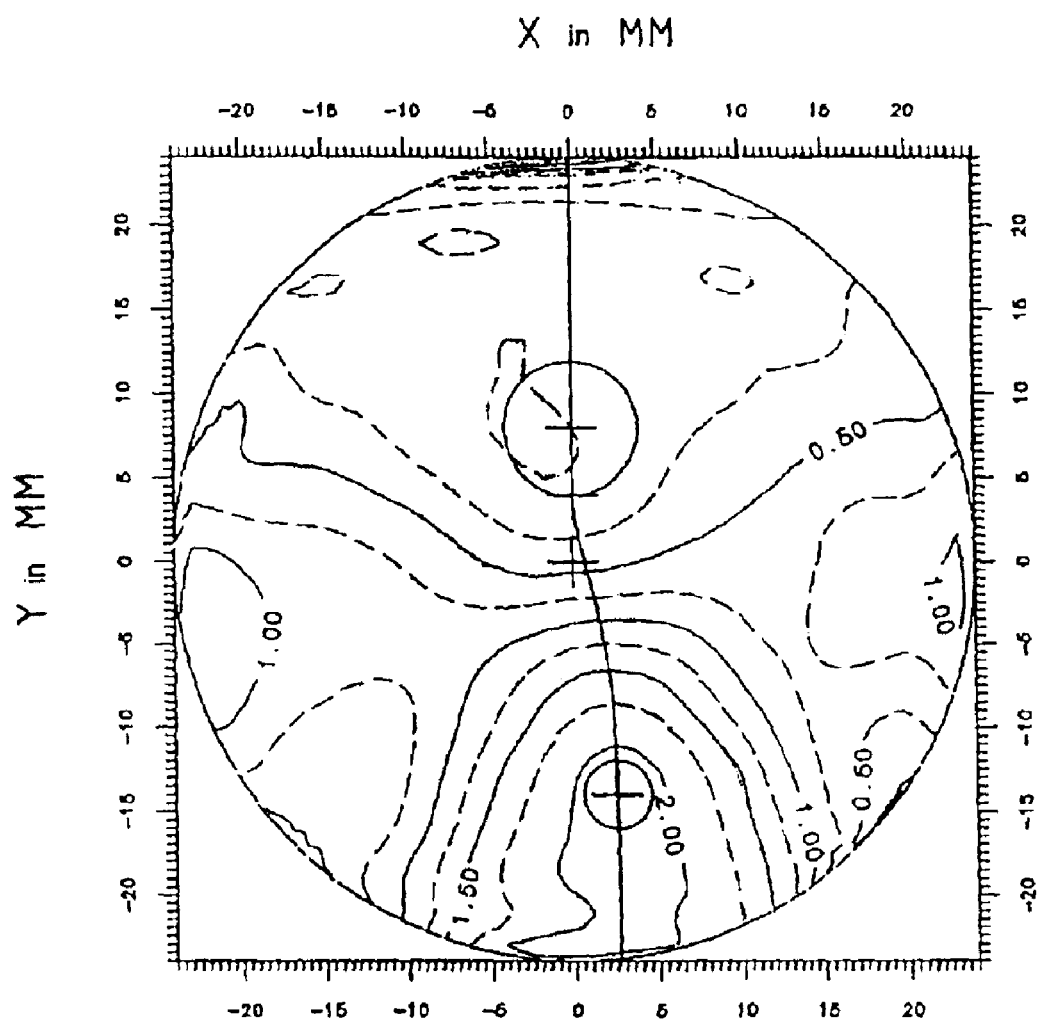
FIG_15

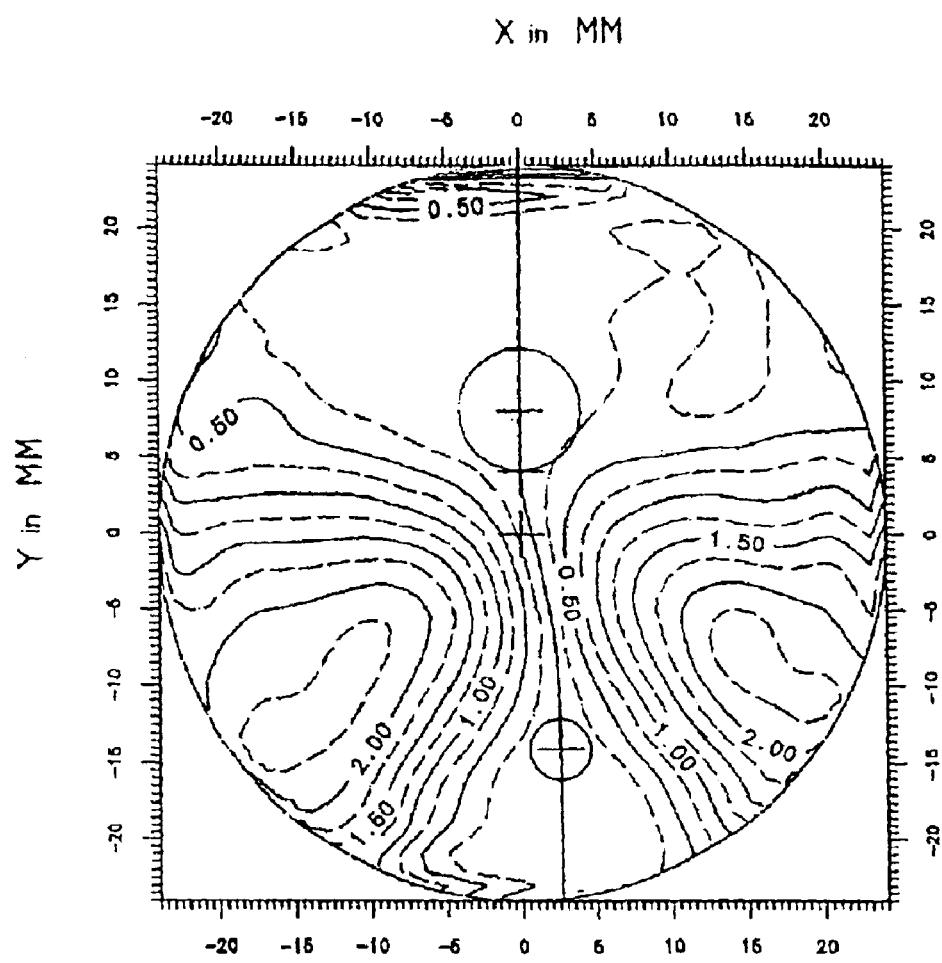

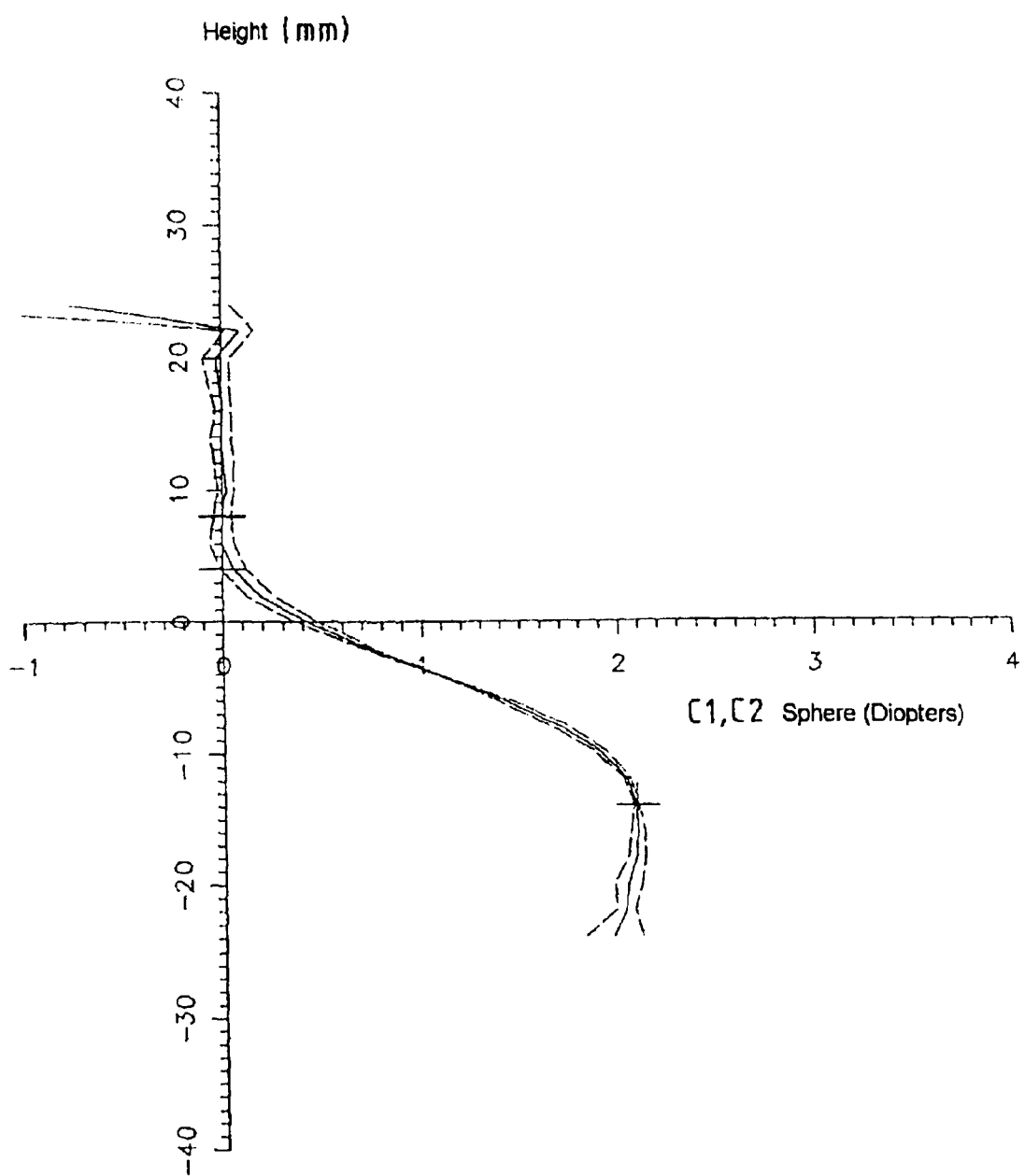
FIG_17

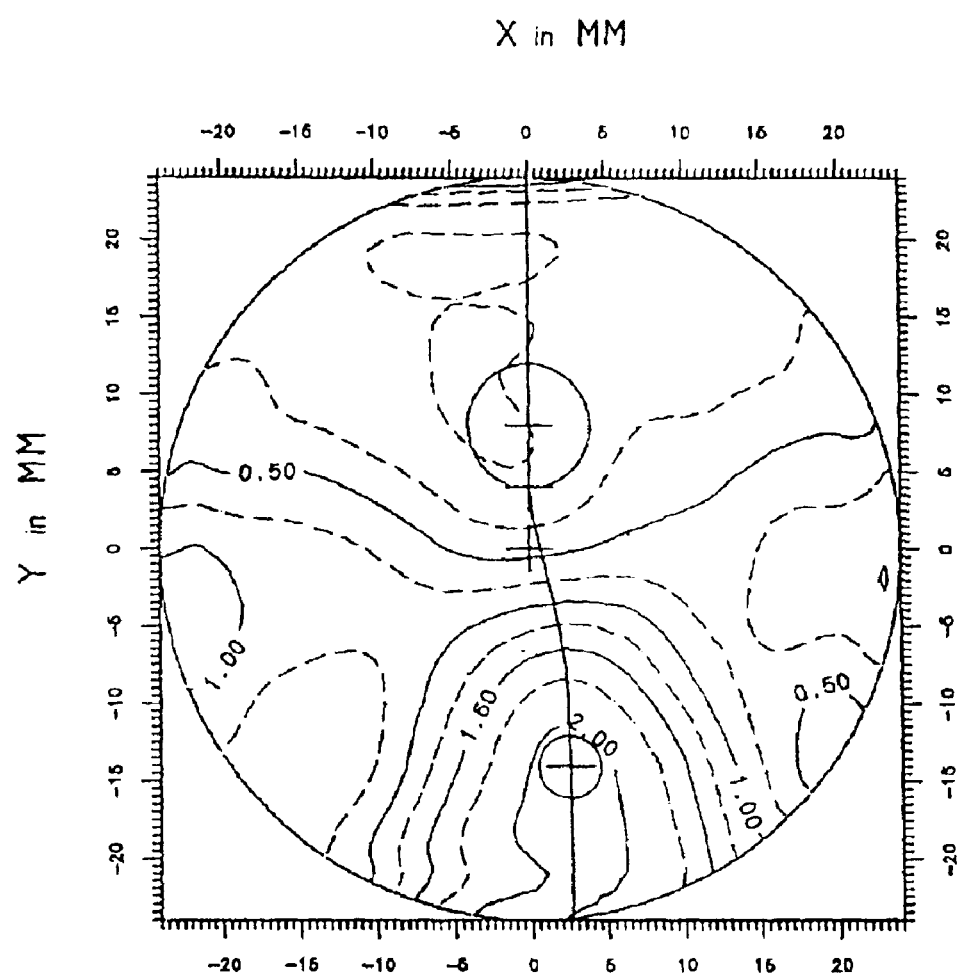
FIG_18

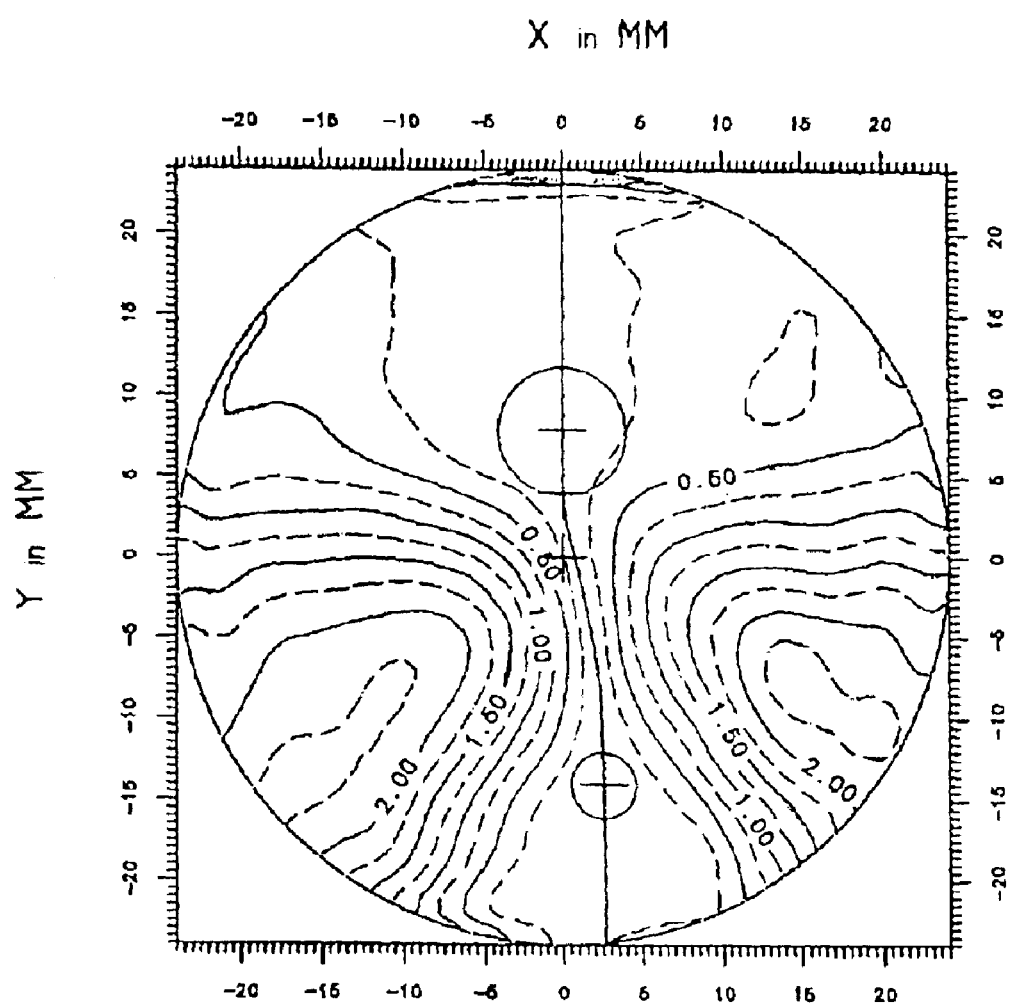
FIG_19

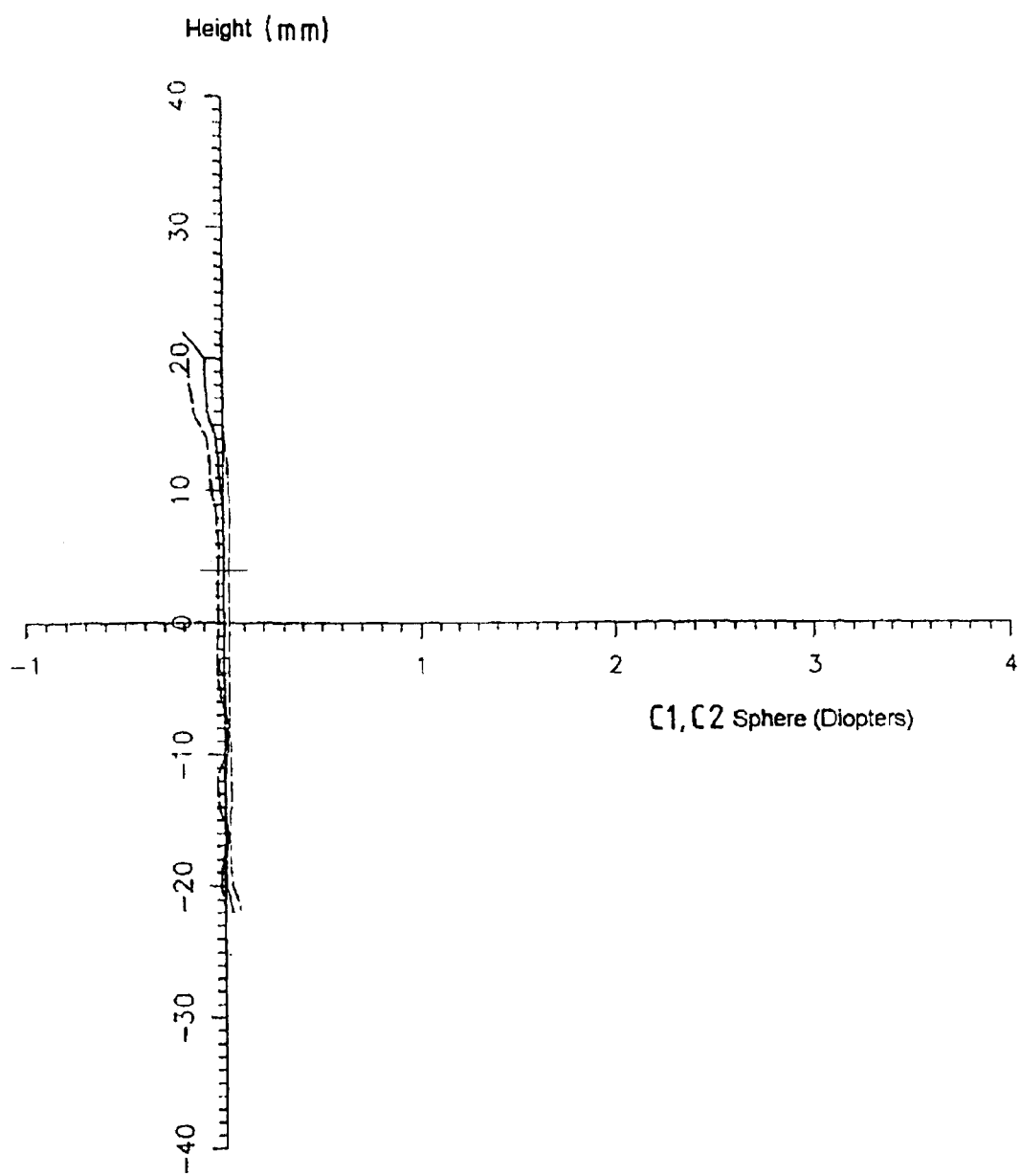
FIG_20

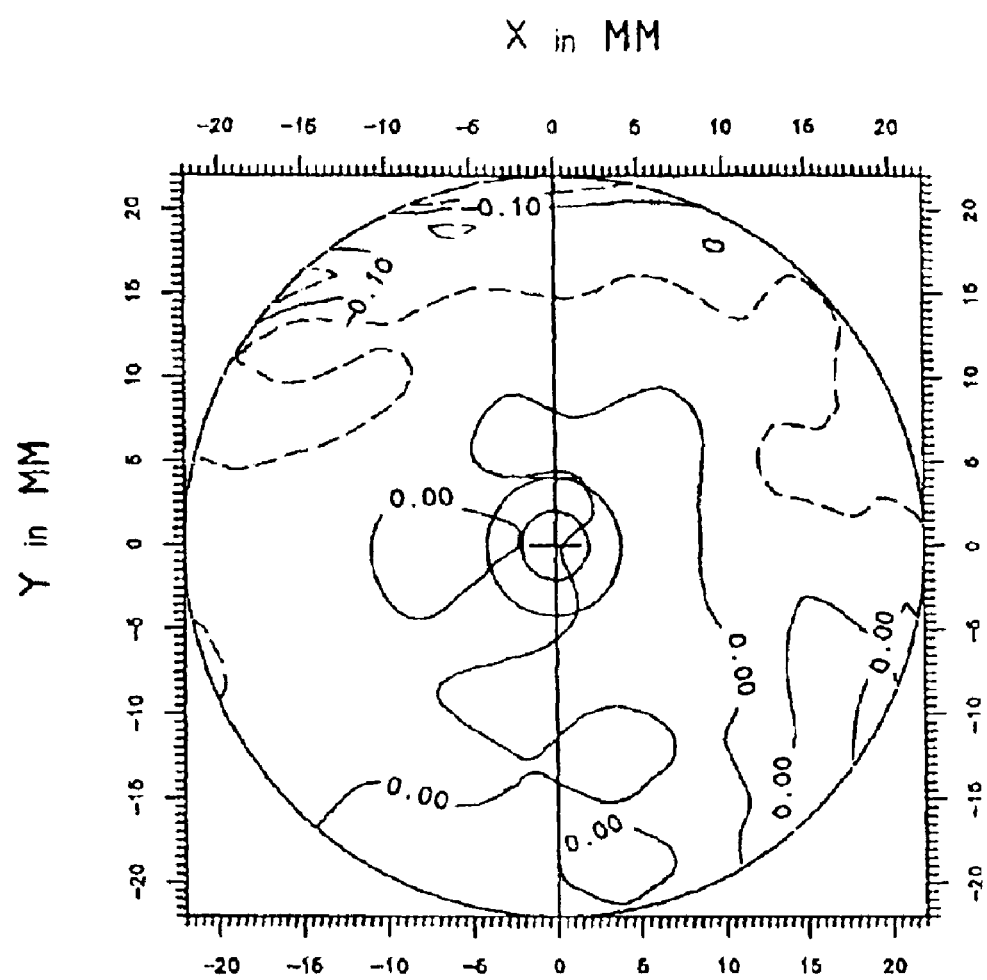
FIG_21

FIG_22
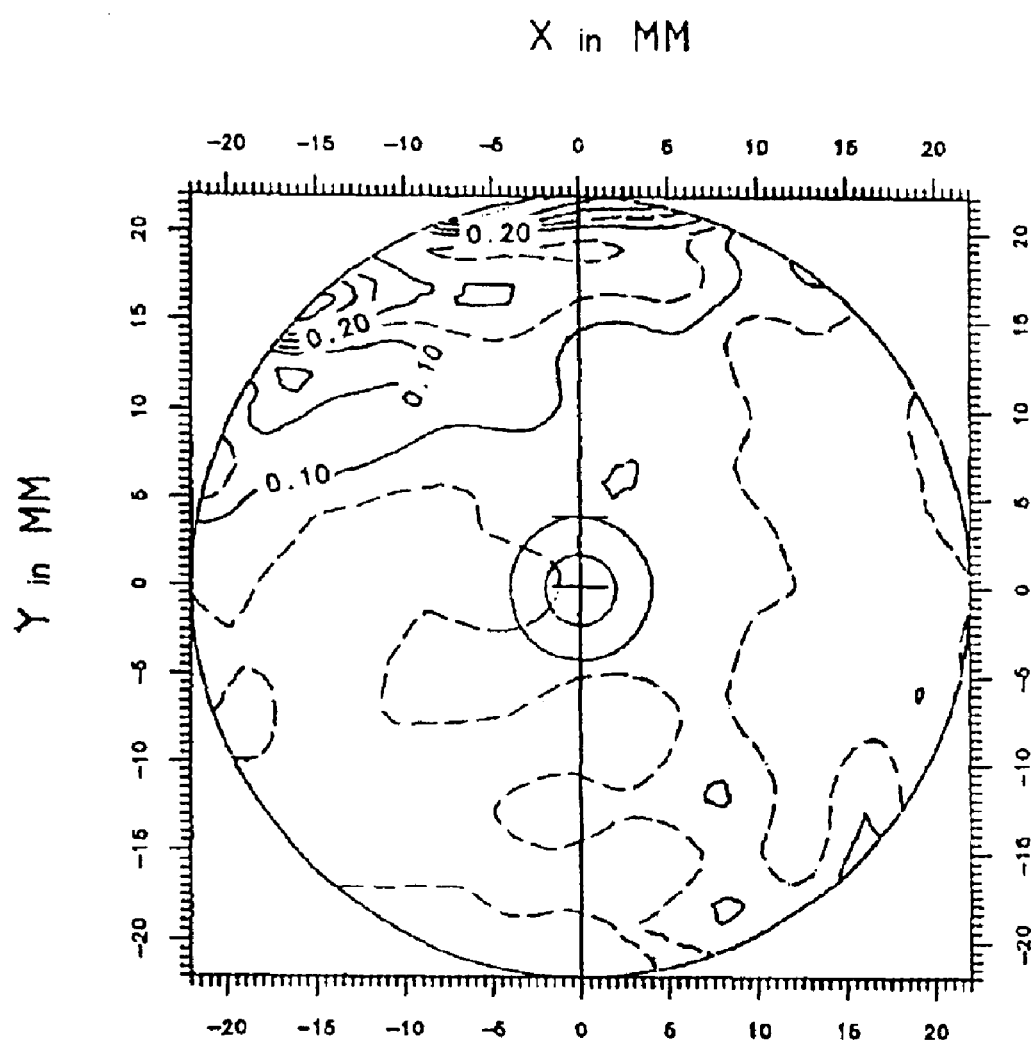

METHOD AND APPARATUS FOR MEASURING THE GEOMETRICAL STRUCTURE OF AN OPTICAL COMPONENT IN TRANSMISSION

The object of the present invention is a method and an apparatus for measuring the geometrical or optical structure of an optical component.

The method according to the invention makes it possible to measure, in an absolute manner, one or more polished surfaces or the index distribution of an optical component. The term "absolute measurement" refers to a measurement which does not require any prior knowledge of the component. The measurement of polished surfaces and/or of index distributions is suitable for many industrial applications. It is especially useful in the ophthalmic field for inspecting or measuring ophthalmic lenses; in this case, the production of complex surfaces requires the simultaneous determination of hundreds of coefficients.

FR-A-2 710 162 or EP-A-0 644 411, in the name of the applicant, describe an apparatus for deflectometry in reflection or in transmission. This apparatus makes it possible to measure the geometrical structure of an optical component by reflection or transmission. The principle of a measurement apparatus of this sort is to illuminate the optical component to be measured by means of radiation of known wave surface—in the simplest case, a plane wave—and to measure the wavefront after reflection from or transmission through the optical component to be measured. The measurement of the wave surface after reflection or transmission makes it possible to reconstruct the geometrical characteristics of the component to be measured.

WO-A-9705467 describes an apparatus of the same type. This document proposes calibration of the apparatus by measuring the transverse aberration of a reference ray after reflection or transmission by the component to be measured.

The apparatuses described in these documents in fact only operate for a single surface of an optical component. For operation in reflection, the apparatuses make it possible to determine the geometrical structure of the surface from which light of known wave surface is reflected. For operation in transmission, the apparatuses make it possible to determine the geometrical structure of one of the surfaces of the optical component, if the other surface and the index of the component are known. Alternatively, in transmission, it is possible to determine the index distribution of the component, if the two surfaces of the component are known. Moreover, from a practical point of view, it is rare to be able to measure all the characteristics of an optical component without modifying the measuring setup.

It is possible, using these apparatuses, to measure in succession the two surfaces of an optical component in reflection, in order thereby to define the optical component; this method has the following drawbacks. On the one hand, if a surface is furnished with an antireflection coating, this coating adversely affects the measurement; such coatings are often provided on ophthalmic lenses. On the other hand, the measurement in reflection may require the rear face of the component to be frosted, in order to avoid spurious images; finally, even if the two surfaces are measured separately, it is necessary to know the relative position of the surfaces in order to rebuild the component, in other words, to know the thickness of the component or the prism at at least one point; this relative positioning adds a source of errors.

U.S. Pat. No. 5,825,476 proposes an apparatus for mapping an optical component. This document proposes to illuminate an optical component by light having a known wavefront, then to collect the light transmitted through the component or reflected thereby, on a microlens array. The microlenses project the transmitted or reflected light onto to a frosted screen; the image of the frosted screen is recorded by a camera and is analyzed in order to determine the structure of the optical component, by comparison with a reference image. The result obtained in transmission is a power map of the component and in reflection, a height map of the component.

In one of the embodiments, this document proposes to carry out two measurements, in two positions of the frosted screen, but without modification to the system other than the position of the frosted screen. These two measurements make it possible, for each microlens, to determine the ray after transmission, given two points for two positions of the frosted screen. The input point is known before the measurement, since it corresponds to a microlens of the matrix placed at the input. Knowing one of the surfaces of the component, it is then possible to determine the second surface of the component.

This document, as in the three preceeding documents, therefore only enables the geometry of one surface of the component to be determined. The geometry of the other surface of the component is assumed to be known for the calculations.

There is therefore a need for an apparatus for measuring lenses, which makes it possible to determine the various characteristics of an optical component, and especially of the two surfaces of this optical component. In particular, an apparatus of this sort makes it possible to measure progressive lenses efficiently, by determining in an exact manner the shape of each of their two surfaces, without having to formulate assumptions concerning one of these surfaces. Consequently, the invention proposes a method for measuring the geometrical structure of an optical component in transmission, comprising the steps:

of illuminating the optical component by means of a first incident beam, the wavefront of which is known, of measuring the wavefront of said first beam after transmission by said optical component, of illuminating the optical component by a second incident beam, the wavefront of which is known, of measuring the wavefront of said second beam after transmission by said optical component,and of calculating the geometrical structure of said optical component from the wavefronts measured during said measurement steps.

In one embodiment of the invention, at the various measurement steps, the wavefronts on the side facing the same surface of the component are different.

Advantageously, Hartmann or Shack-Hartmann deflectometry, or fringe deflectometry, or else measurement by interferometry can be used for the measurement step.

Preferably, the illumination steps comprise illuminating the component on one of its surfaces, and illuminating the component on the other of its surfaces. In this case, the first and second beams may have identical wavefronts. In particular, provision may be made so that the illumination steps comprise illuminating the optical component by the same incident beam, the method then comprising a step of turning the optical component around.

In another embodiment, the illumination steps comprise illuminating the component on only one of its surfaces.

In this case, the first and second beams may have different wavefronts.

It is possible for the calculation step to be carried out by optimizing a merit function calculated from at least two measurement steps. It is also possible to provide a step of measuring the thickness of the component at at least one point.

In one embodiment, the method further comprises steps:
of illuminating the optical component by a third incident beam, the wavefront of which is known, and
of measuring the wavefront of said third beam after transmission by said optical component.

The invention also provides an apparatus for measuring the geometrical structure of an optical component in transmission, comprising:
means of illuminating the optical component by means of a first incident beam, the wavefront of which is known,
means of measuring the wavefront of said first beam after transmission by said optical component,
means of illuminating the optical component by a second incident beam, the wavefront of which is known, and different
means of measuring the wavefront of said second beam after transmission by said optical component,
means of calculating the geometrical structure of said optical component from the wavefronts measured during said measurement steps.

In one embodiment, the measuring means comprise a microlens matrix. They may also comprise an array.

Advantageously, the means of illuminating the optical component by a first incident beam and the means of illuminating the optical component by a second incident beam illuminate respectively the component on each of its surfaces. In this case, the first and second beams may have identical wavefronts.

In another embodiment, the means of illuminating the optical component by a first incident beam and the means of illuminating the optical component by a second incident beam illuminate the same surface of the component. In this case, the first and second beams may have different wavefronts.

The apparatus may further comprise means of measuring the thickness of the component.

In one embodiment, the apparatus comprises:
means of illuminating the optical component by a third incident beam, the wavefront of which is known,
means of measuring the wavefront of said third beam after transmission by said optical component.

It is also possible to provide means of displaying micro-etchings on the component.

Other characteristics and advantages of the invention will become apparent on reading the following detailed description of embodiments of the invention, given solely by way of example and with reference to the drawings which show:

FIGS. 1 to 5, schematic representations of various embodiments of an apparatus for implementing the invention;

FIG. 6, a schematic representation for calculating a merit function;

FIG. 7, a representation similar to that of FIG. 6, in the case of a plane incident wavefront;

FIGS. 8 to 13, characteristics of a lens obtained by mechanical measurement of the lens;

FIGS. 14 to 16, the characteristics of the lens of FIGS. 8 to 13, obtained by reconstruction according to the prior art;

FIGS. 17 to 22, the characteristics of the lens of FIGS. 8 to 13, obtained by the method of the invention.

The invention is based, as in the apparatuses of the applicant described in FR-A-2 710 162 or WO-A-9705467, on the analysis of wavefronts—or of rays which are perpendicular thereto—after and before transmission by the component to be measured. To measure the wavefront of the light after transmission by the component it is possible to use, as in these documents, a fringe deflectometry method, or else a deflectometry method called "Hartmann" or "Shack-Hartmann" deflectometry. It is also possible to measure the wavefront of the light transmitted by interferometric methods, and, for example, by Mach-Zender interferometry, or by interferometry using the method called "lateral shearing interferometry".

The invention proposes to carry out two measurements in transmission in two different optical configurations, and thereby to define, without prior assumptions, the two surfaces of the component and their relative position. A possible solution consists in minimizing or maximizing a merit function by taking all the coefficients representing the lens geometry as variables, such that, when the merit function is a minimum—or a maximum—the values taken by the variables correspond to the values of each of the coefficients which define the geometrical characteristics of the component. The optical configurations are different, to the extent where the component is traversed by different optical paths.

In particular, the invention may be applied to the measurement of finished lenses. Compared to the prior art, it avoids assuming that one of the surfaces of the lenses is known. It is more accurate and simpler to implement than two measurements in reflection on the two faces of the component:
the invention may be implemented even if the surfaces of the component are coated with an antireflection treatment;
the invention is implemented without frosting the rear surface of the component to be measured in order to prevent spurious images;
the invention avoids the problems of relative positioning of the two surfaces measured separately by reflection.

An embodiment of the invention, in which the wave surfaces are determined by deflectometry called "Hartmann" or Shack Hartmann" deflectometry, will be described below; the principle of this deflectometry is described in U.S. Pat. No. 5,825,476. As explained in this document, the optical component to be measured is illuminated by light having a known wavefront. The light transmitted by the optical component is applied to an array of microlenses, which form images in a plane physically embodied by a frosted screen or by a matrix of charge-coupled sensors (CCD). The position of the image point of each microlens depends on the wavefront applied to the microlens. The insertion of an optical component in the system causes a variation in the wavefront incident on the microlenses, and therefore a variation in the position of the image point of each microlens; analysis of the displacement of the image point of each microlens makes it possible to measure the variation of the wavefront caused by insertion of the optical component in the system.

FIG. 1 shows a schematic representation of a first embodiment of an apparatus to implement the invention; in the embodiment of FIG. 1, two different incident beams, and more specifically, one beam having a plane wavefront and one beam having a spherical wavefront, in two different configurations are used for the two measurements in transmission.

The apparatus of FIG. 1 therefore has a support (not shown) to accommodate an optical component 2, which has a rear surface 4 and a front surface 6; the terms "front" and "rear" are used here solely to identify the surfaces, and do not necessarily correspond to the subsequent use of the component; in other words, the component may be placed "back to front" in the apparatus.

In addition, the apparatus has a source of light having a plane wavefront. As in WO-A-9705467, a point source 8 and a lens 10 may be used, which generate a beam incident on the rear surface 4 of the component to be measured, with a plane wavefront. The apparatus also has a light source having a spherical wavefront. It is possible to use a second point source 12, which generates a beam incident on the rear surface of the component with a spherical wavefront. A semireflecting plate 14 is used to illuminate the rear surface 4 of the component with beams coming from the sources 8 and 12, namely, the beam coming from the source 8 and from the lens 10 passes through the semireflecting plate 14, while the light coming from the source 12 is reflected by the plate 14. It is also possible to use a common source for the two beams, for example by making the collimation lens 10 retractable. It is therefore possible in the apparatus of the invention to illuminate the rear component surface 4 successively with two beams, each having a known wavefront.

The apparatus may also have means to measure the thickness of the component at one point. It is possible, for example, for the component to be measured in reflection along the axis of the device, on either side of the component. A measurement of this sort makes it possible to determine the normal to the surfaces of the component at the intersection with the axis of the apparatus, and also the thickness of the component on this axis. For these measurements, it is possible to use the means described in FR-A-2 710 162 or WO-A-9705467, from the side facing the rear surface or from the side facing the front surface, which will not be described again here.

A thickness measurement of this sort is not indispensable to implementing the invention; the thickness measurement makes it possible to accelerate the determination of the characteristics of the component. It remains possible not to measure the thickness of the component, and to determine the latter during the search by optimization, which is described below.

Next, the apparatus has means for determining the wavefront of the light transmitted by the component. In the embodiment of the figure, as indicated above, it is possible to use Hartmann deflectometry, or Shack-Hartmann deflectometry when microlenses are used; the apparatus should therefore has a microlens array 16 and an analysis plane 18, on which the microlenses form an image. This analysis plane may consist either of a frosted screen, or directly, of a CCD. As explained above, analysis of the image formed on the analysis plane makes it possible to determine the wavefront of the light transmitted through the component.

Typical dimensions of the apparatus of FIG. 1 are as follows: the lens 10 is located on the main axis passing through the component 2 to be measured and the microlens matrix 16; it has a diameter of 100 mm and a focal length of between 110 and 250 mm. The splitter plate 14 has a diameter of 150 mm. The distance between the second source 12 (located on an axis perpendicular to the main axis) and the intersection point between the 14 and the main axis is about 70 mm. The distance between this same point and the surface of the optical component 2 is also about 70 mm. The distance between the component 2 and the Shack-Hartmann may also be between 0 and 30 mm. The sources 8 and 12 may be laser diodes or light-emitting diodes.

The apparatus of FIG. 1 therefore makes it possible to measure the wavefront of two beams transmitted by the component. In other words, the apparatus makes it possible to measure, in two different configurations, the transmission of an incident beam of known wavefront through the component to be measured. The apparatus may, as required, also enable the thickness of the component to be measured at one point. In FIG. 1, the component is centered on the optical axis of the apparatus; as explained below, it is not necessary in the method of the invention for the component to be accurately centered on the optical axis of the apparatus, and rough positioning is enough.

FIG. 2 shows a schematic representation of a second embodiment of an apparatus to implement the invention. In the embodiment of FIG. 2, a single light source is used for the two measurements in transmission according to two different configurations, but the component is turned around in order to illuminate its two surfaces. The apparatus therefore has a light source 20 generating a beam of known wavefront—in the example of the figure a beam of spherical wavefront. The beam impinges on a component 22 mounted on a support (not shown); the component has a rear surface 24 and a front surface 26. The apparatus then has means for determining the wavefront of the light transmitted by the component; as in the embodiment of FIG. 1, a microlens array 28 and an analysis plane 30 are used.

The apparatus of FIG. 2 makes it possible to measure the wavefront of the light transmitted by the component according to different configurations, as will now be explained. Initially, the optical component is mounted in the support, as shown in the figure; the light coming from the source 20 illuminates the component on its rear surface 24 and the wavefront of the transmitted light is determined by the array 28 and the plane 30. The optical component 22 is then turned around by rotating the support, as symbolized by the arrow 32 in FIG. 2. The light coming from the source 20 then illuminates the component on the front surface 26 and the wavefront of the transmitted light is determined by the array 28 and the plane 30.

In other words, the first configuration corresponds to illumination of the component on its rear surface 24 by the known light emitted by the source 20. The second configuration corresponds to illumination of the component on its front surface 26 by the known light emitted by the source 20. The important aspect in the apparatus of FIG. 2 is to be able to return the two configurations to the same coordinate system linked to the component; to this end, one solution consists in accurately knowing the nature of the turn-around; for this, it is possible simply to use a support providing a known turn-around of the optical component.

FIG. 3 shows a schematic representation of a third embodiment of an apparatus to implement the invention. In the embodiment of FIG. 3, different light sources, which illuminate the component on its two surfaces, are used for the two measurements in transmission according to two different configurations.

The apparatus of FIG. 3 therefore has a support (not shown) to accommodate an optical component 34, which has a rear surface 36 and a front surface 38. Furthermore, the apparatus has a light source having a plane wavefront; this light source consists of a point source 40 and a lens 42, which generate, through a semireflecting plate 44, light incident on the rear surface 36 of the component to be measured, with a plane wavefront. The light, transmitted by the component is reflected by a second semireflecting plate 46 toward a microlens array 48 and a CCD plane 50.

The apparatus also has a light source having a spherical wavefront, which illuminates the component on the front surface. A second point source 52 is used, which generates, through the semireflecting plate 46, light incident on the front surface 38 of the component 34, with a spherical wavefront. The light coming from the source 52 and transmitted by the optical component is reflected by the semireflecting plate 44 toward a second microlens array 54 and a second CCD plane 56.

Obviously, the apparatus allows the light transmitted by the component to be measured in two configurations. In the first configuration, the component is illuminated on its surface 36, termed rear surface, by light having a plane wavefront; in the second configuration, the component is illuminated on its surface 38, termed front surface, by light having a spherical wavefront. Of course, it would be possible to modify the device so as to use only a single set of the means of measuring the transmitted wavefront, for example using additional mirrors and semireflecting plates.

FIG. 4 shows a schematic representation of a fourth embodiment of an apparatus to implement the invention. The apparatus of FIG. 4 differs from that of FIG. 3 solely in that, in the second configuration, light having a plane wavefront is used; the point source 52 of FIG. 3 is therefore replaced in FIG. 4 by a point source 58 and a lens 60, which illuminate the front surface 38 of the component with light having a plane wavefront.

FIG. 5 shows a schematic representation of a fifth embodiment of an apparatus to implement the invention. The apparatus of FIG. 5 has the advantage of being able to display not only data relating to the structure of the optical component to be measured, but also etchings on this component. For an ophthalmic lens, these etchings are important for the optician; this is because they are taken as a reference during the trimming operation, which makes it possible to match the lens to the frame shape chosen by the wearer. The apparatus of FIG. 5 therefore has illumination and measurement means for two different configurations. A CCD camera which focuses on the surface of the lens makes it possible to display the etchings.

The apparatus therefore has a support (not shown) to accommodate an optical component 62, which has a rear surface 64 and a front surface 66. A CCD camera 68 is focused, using a lens 70, on the surface of the component. The axis 72 of the camera and of the lens is substantially coincident with the optical axis of the component.

Furthermore, the apparatus has a light source having a plane wavefront; this light source consists of a point source 74 and a lens 76, which generate light incident on the front surface 66 of the component to be measured, with a plane wavefront. The light with a plane wavefront is transmitted by the component to a microlens array 78 and a CCD plane 80. The light with a plane wavefront is obliquely incident on the component to be measured, so that the etchings of the component can be displayed; more specifically, the angle α between the axis 82 of the measurement path and the axis 72 of the path for displaying the microetchings is greater than 10°.

The apparatus also has a light source having a spherical wavefront, which illuminates the component on the rear surface. A second point source 84 is used, which generates light incident on the rear surface 64 of the component, with a spherical wavefront. Light coming from the source 84 is transmitted by the optical component toward a second microlens array 86 and a second CCD plane 88. Light with a spherical wavefront is also obliquely incident on the component to be measured, in order that the etchings of the component can be displayed; more specifically, the angle β between the axis 90 of the measurement path and the axis 72 of the path for displaying microetchings is greater than 10°.

The apparatus of FIG. 5 makes it possible to measure the light transmitted by the component in two configurations similar to those of FIG. 3, close to the angle of incidence. Furthermore, it makes it possible to display the microetchings of the lenses, and therefore to provide a measurement of the component in a coordinate system connected to the microetchings.

It is again understood that, in the apparatus of FIG. 5, it would be possible to use sources providing illumination with beams of identical wavefront, or else sources illuminating the same surface of the optical component. In all cases, as described with reference to FIG. 1, it is possible to provide means to measure the thickness of the component at one point.

For all the apparatuses described, it is possible, by virtue of the optimization described below, to rebuild the surfaces and the thickness independently of the position of the optical component in the frame of reference of the assembly. In order then to be able to combine the surfaces of the optical component, it may be beneficial, as explained in FIG. 5, to determine the position of one point of the optical component in the reference frame. In addition to the solution proposed in FIG. 5, it is possible as a result to provide, in the apparatus, means for measuring the position of a point on one of the surfaces of the optical component. For example, it is possible to use autocollimation of a laser or other means known per se to measure the position of one point of the optical component in the reference frame of the apparatus; it would also be possible to measure the angle made by the surface of the optical component with the optical axis of the apparatus. This solution makes it possible, in one way or another, to combine the defined surface of the component by virtue of the invention and the optical component itself.

From these wavefront measurements in transmission in two configurations, the invention proposes to define the structure of the component. To this end, it proposes to use a search by optimization of the two surfaces of the component, using a merit function representative of the two wavefronts transmitted in the two different configurations. The definition of the merit function is independent of the two surfaces, and in any case, makes it possible to reconstruct these two surfaces. Unlike solutions of the prior art, the invention is based on the observation that the simultaneous exploitation of two measurements makes it possible to define the two surfaces of the component.

If the thickness of the component is not measured, it may also be determined during the search by optimization. In this case, it turns out that the merit function may have local minima for some thickness values, but always has an absolute minimum for the actual thickness of the component. If the thickness is known, it may be enough to search for the minimum for this thickness value. In some cases, local optimization does not enable the thickness of the component to be found; at this point, overall optimization makes it possible to find the extremum, and therefore the thickness of the component.

The principle of a search by optimization is known per se. Initial values are defined for the front and rear surfaces of the optical component. A merit function, capable of being calculated for current values of the front and rear surfaces of the component, is defined; this merit function is designed to have a minimum or maximum value when the current values of the front and rear surfaces are equal to the values to be measured. The optimization consists in making the current values of the front and rear surfaces vary by successive iterations, starting with the initial values, until finding an extremum of the merit function.

FIG. 6 shows an example of a merit function definition for calculating surfaces; in the case of FIG. 6, the explanation is in terms of wavefronts, when illuminating the component on its rear surface.

In the figure, the appearance of the optical component being reconstructed is shown, in other words the current values of the rear surface 92 and of the front surface 94. The known wavefront 96 of the light incident on the rear surface 92 is plotted on the figure, together with the measured wavefront 98 of the light transmitted by the component. The figure also shows a ray 100 recorded after transmission through the component, in one of the measurement configurations. Given the current values of the rear surface 92 and of the front surface 94, it is possible to calculate, in the incident wavefront space, the incident ray 102 by reverse propagation through the optical component. It is thus possible to determine the intersection of the incident ray 102 with the incident wavefront 96, which is known. At the point of intersection thus determined, the differences between the direction cosines (x, y, z) of the ray 102 and the direction cosines ($\hat{x}$, $\hat{y}$, $\hat{z}$) of the normal 104 to the wavefront are calculated. Here, the coordinates in a coordinate system with a unit vector colinear with the ray or with the normal are called direction cosine.

The merit function may then be expressed as the sum of the differences squared of the direction cosines, for various rays, and for the two measurement configurations, that is to say:

$$\sum_{configurations} \left\{ \sum_{rays} [(x-\hat{x})^2 + (y-\hat{y})^2 + (z-\hat{z})^2] \right\} \quad (1)$$

It is clear that this definition corresponds to a merit function:
it combines a real number with current surface values;
the function is positive or zero;
it is cancelled out if, in the two measurement configurations, the rays calculated by reverse propagation are identical to the rays of the incident light, in other words, if the current values for the front and rear surfaces are identical to the actual front and rear surfaces.

In other words, the function has an extremum when the values of the surfaces are equal to the actual surfaces of the component. The merit function may consist of any function which quantifies the differences between the current wavefront and the reference wavefront.

FIG. 7 is similar to FIG. 6, but shows the case of an incident reference wavefront which is plane. In this case, the normal to the incident wavefront is constant over the entire surface of the optical component; it is therefore identical for any ray 102, which simplifies the calculations; this is because it is only necessary to calculate the direction cosines of the normal to the wavefront once. In such a configuration, it is enough to know the direction cosines of the ray 102, at the surface of the component illuminated by the beam with a plane wavefront, without having to continue with the reverse propagation of the ray 102. A second ray 106 and the ray 108 constructed by reverse propagation are plotted on the figure.

Other merit functions may be used. In all cases, the merit function is calculated from transmission of the light in the two different optical configurations mentioned above. Using a merit function calculated from two different configurations makes it possible to define simultaneously the two surfaces of the optical component.

The invention makes it possible to define accurately the two surfaces of an optical component, after two measurements in transmission. An implementational example of the invention will now be given, for measuring a progressive lens. The progressive lens measured was a lens marketed by the applicant under the trademark Varilux Comfort; the rear face is spherical; the front face is progressive. The lens has a base of 7.25 diopters, a power of 5.00 diopters, a cylinder of zero prescription and an addition of 2.00 diopters. In the example, two measurements in transmission have been used with two beams of plane incident wavefront passing through the component in opposite directions. The microlens matrix had a 2 mm pitch, and the incident light illuminated the lens over a diameter of 50 mm; the distance between the rear face of the lens and the sensor matrix was 12 mm in each direction of the incident light.

For the optimization, a merit function of the type described above was used, with 845 rays. The initial values used for the front and rear surfaces and the thickness are as follows:
rear surface: spherical surface of 160 mm radius;
front surface: arbitrary parabolic surface of $1 \times r^2$ with a 56 mm diameter;
thickness of the component: 2 mm.

The optimization is carried out by a least-squares method, over 461 variables, that is to say a model using a Zernike polynomial with 230 variables for each surface, and one variable for the thickness. After 10 iterations, the merit function reaches a value of $0.1 \times 10^{-14}$.

The results obtained are compared with the results of a mechanical measurement of each surface of the component, using a three-dimensional measurement machine, with an accuracy better than 1 µm and a measuring pitch of 2 mm. At each measurement point, and for each surface, the difference between the height calculated according to the invention and the measured height is less than 1 µm.

FIGS. 8 to 22 show the characteristics of the lens in this implementational example of the invention. FIGS. 8 to 13 show the characteristics of the lens, obtained from a mechanical measurement of the invention, and more precisely:
FIG. 8, the mean sphere and the maximum and minimum curvatures of the meridian of the front face of the lens;
FIG. 9, the mean sphere map of the front face;
FIG. 10, the cylinder map of the front face;
FIG. 11, the mean sphere and the maximum and minimum curvatures of the meridian of the rear face of the lens;
FIG. 12, the mean sphere map of the rear face;
FIG. 13, the cylinder map of the rear face.

For FIGS. 8 and 11, the meridian is defined by three segments, as explained in patents FR-A-2 683 642 and FR-A-2 683 643 of the applicant.

FIGS. 14 to 16 show the results of a reconstruction according to the prior art, which would correspond in practice to the results obtained with the method described in patent FR-A-2 710 162 or EP-A-0 644 411 of the applicant, by assuming that the rear face is perfectly spherical, and has a radius of 164.38 mm. The figures show:
FIG. 14, the mean sphere and the maximum and minimum curvatures of the meridian of the front face of the lens;
FIG. 15, the mean sphere map of the front face;
FIG. 16, the cylinder map of the front face;
FIGS. 17 to 22 are similar to FIGS. 8 to 13, but show the results obtained by the method of the invention. Considerable similarity will be noticed between the respective figures. In particular, the defects of the rear face of the component are found by virtue of the invention, the set value of which is perfectly spherical.

By comparison, FIGS. 10 and 19 are quite different from FIG. 16, especially with regard to the upper part of the lens, which corresponds to the far vision region. In other words, substantially the same results are obtained by virtue of the invention as in a mechanical measurement; however, these results are different from those obtained by assuming that the rear face of the lens is perfectly spherical. Compared to the solution of the prior art, the invention makes it possible to show, on the front face of the lens, defects of the rear face, when the latter is not exactly identical to its set value.

Similarly, the meridian shown in FIG. 20 corresponds well to the measured meridian shown in FIG. 11. In this case, the differences with respect to the rear surface, assumed to be spherical, are small.

Of course, the present invention is not limited to the embodiments described by way of example; thus, in order to determine the wavefront of the transmitted light, it is possible to use methods other than Hartmann deflectometry, and for example, a fringe deflectometry method as in FR-A-2 710 162 or WO-A-9705467 using a Ronchi ruling. It is also possible to use interferometric methods. The method of the invention is not limited to highlighting small differences; the invention makes it possible to determine the corrections provided by each of the two surfaces without prior assumptions concerning these two surfaces.

In the assembly of FIG. 1, as in that of FIG. 2, it is possible to use other means to generate light with different wavefronts; in the embodiment of FIG. 1, it would be possible to change the collimation lens 10, or add an additional lens. In the embodiment of FIG. 2, it would be possible to use a single source, and to turn the component around. It would also be possible to mix the embodiments, and to use a light source with a plane wavefront and a light source with a spherical wavefront in the embodiment of FIG. 2. This is applicable also to FIGS. 3 to 5.

If the thickness of the component at the center or at one point is known, it is possible to dispense with the means of measuring this thickness; alternatively, all the known means for determining the prism or the thickness of the component may be used.

In the examples given above, it has been proposed to use two series of measurements to determine the characteristics of the two surfaces of the two lenses. It is also possible to carry out more than two series of measurements, still in transmission configurations. As explained above, different configurations are used, that is to say different incident and transmitted wavefronts.

Carrying out more than two measurements may in particular be useful to determine, by optimization, other characteristics of the optical component. For example, for an optical component of variable index, using three series of measurements, it would be possible to determine the surfaces of the optical component and the index distribution. It is also known to form optical components from two disks having a plane face and a nonplane face, which are assembled by their plane face. For a component of this sort, the invention makes it possible to determine not only the surfaces and the thickness of the component, but also the position of the interface between the two disks.

In each case, it is advantageous for the incident light to illuminate the whole of the useful surface of the optical component, that is to say the part of the component whose characteristics are being sought.

What is claimed is:

1. A method for measuring the geometrical structure of an optical component in transmission, comprising the steps:

of illuminating the optical component by means of a first incident beam, the wavefront of which is known, of measuring the wavefront of said first beam after transmission by said optical component, of illuminating the optical component by a second incident beam, the wavefront of which is known, of measuring the wavefront of said second beam after transmission by said optical component, and of calculating the geometrical structure of said optical component from the wavefronts measured during said measurement steps, wherein, at the various measurement steps, the wavefronts on the side facing the same surface of the component are different.

2. The method of claim 1, wherein the measurement step is carried out by Hartmann or Shack-Hartmann deflectometry.

3. The method of claim 1, wherein the measurement step is carried out by fringe deflectometry.

4. The method of claim 1, wherein the measurement step is a step of measuring by interferometry.

5. The method of claim 1, wherein the illumination steps comprise illuminating the component on one of its surfaces, and illuminating the component on the other of its surfaces.

6. The method of claim 5, wherein the first and second beams have identical known wavefronts.

7. The method of claim 6, wherein the illumination steps comprise illuminating the optical component by the same incident beam, and wherein the method further comprises a step of turning the optical component around.

8. The method of claim 1, wherein the illumination steps comprise illuminating the component on only one of its surfaces.

9. The method of claim 8, wherein in that the first and second beams have different known wavefronts.

10. The method of claim 1, wherein the calculation step is carried out by optimizing a merit function calculated from at least two measurement steps.

11. The method of claim 1, further comprising a step of measuring the thickness of the component at at least one point.

12. The method of claim 1, further comprising the steps of:

illuminating the optical component by a third incident beam, the wavefront of which is known, measuring the wavefront of said third beam after transmission by said optical component.

13. An apparatus for measuring the geometrical structure of an optical component in transmission, comprising:

a first source for illuminating the optical component with a first incident beam, the wavefront of which is known, a second source for illuminating the optical component with a second incident beam, the wavefront of which is known, and different from the wavefront of said first beam;

a wavefront measuring device for measuring the wavefront of said first beam after transmission by said optical component and for measuring the wavefront of said second beam after transmission by said optical component, a computing logic for calculating the geometrical structure of said optical component from the measured wavefronts of said first and second beams.

14. The apparatus of claim 13, wherein the wavefront measuring device comprises a microlens matrix.

15. The apparatus of claim 13, wherein the wavefront measuring device comprises an array.

16. The apparatus of claim 13, wherein the first source and the second source illuminate the component respectively on each of its surfaces.

17. The apparatus of claim 13, wherein the first source and the second source illuminate the same surface of the component.

18. The apparatus of claim 13, further comprising a thickness measuring device for measuring the thickness of the component.

19. The apparatus of claim 13, further comprising a third source for illuminating the optical component with a third incident beam, the wavefront of which is known, wherein the wavefront measuring device is further adapted for measuring the wavefront of said third beam after transmission by said optical component.

20. The apparatus of claim 13, further having a light source adapted for displaying microetching on the component.

21. An apparatus for measuring the geometrical structure of an optical component in transmission, comprising:

a first source for illuminating the optical component of one of its surfaces with a first incident beam, the wavefront of which is known, a second source for illuminating the optical component on another of its surfaces with a second incident beam, the wavefront of which is known;

a wavefront measuring device for measuring the wavefront of said first beam after transmission by said optical component and for measuring the wavefront of said second beam after transmission by said optical component, a computing logic for calculating the geometrical structure of said optical component from the measured wavefronts of said first and second beams.

22. The apparatus of claim 21, wherein the wavefront measuring device comprises a microlens matrix.

23. The apparatus of claim 21, wherein the wavefront measuring device comprises an array.

24. The apparatus of claim 21, wherein the first and second beams have identical wavefronts.

25. The apparatus of claim 21, wherein the first and second beams have different wavefronts.

26. The apparatus of claim 21, further comprising a thickness measuring device for measuring the thickness of the component.

27. The apparatus of claim 21, further comprising a third source for illuminating the optical component with a third incident beam, the wavefront of which is known, wherein the wavefront measuring device is further adapted for measuring the wavefront of said third beam after transmission by said optical component.

28. The apparatus of claim 21, further having a light source adapted for displaying microetching on the component.

* * * * *